United States Patent
Choi et al.

(10) Patent No.: US 9,349,347 B2
(45) Date of Patent: May 24, 2016

(54) APPARATUS AND METHOD FOR CONTROLLING SCREEN BRIGHTNESS IN PORTABLE TERMINAL

(75) Inventors: Chi-Jeong Choi, Gyeonggi-do (KR); Tae-Youn Kwon, Gyeonggi-do (KR); Jun-Seok Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 285 days.

(21) Appl. No.: 13/428,596

(22) Filed: Mar. 23, 2012

(65) Prior Publication Data

US 2013/0093799 A1  Apr. 18, 2013

(30) Foreign Application Priority Data

Oct. 14, 2011  (KR) .................. 10-2011-0105045

(51) Int. Cl.
G09G 5/10 (2006.01)
H04W 52/02 (2009.01)
G06F 1/32 (2006.01)
G06F 3/147 (2006.01)

(52) U.S. Cl.
CPC .............. *G09G 5/10* (2013.01); *G06F 1/3206* (2013.01); *G06F 1/3265* (2013.01); *H04W 52/027* (2013.01); *G06F 3/147* (2013.01); G09G 2320/0626 (2013.01); G09G 2330/021 (2013.01); G09G 2340/045 (2013.01); G09G 2360/144 (2013.01); Y02B 60/1242 (2013.01)

(58) Field of Classification Search
CPC ............. G09G 5/00; G09G 3/36; G09G 3/30; G09G 3/28; G06F 3/041; G06F 3/045; G06K 11/06; G08C 21/00

USPC ................... 345/156, 163, 690; 715/835, 856
See application file for complete search history.

(56) References Cited

U.S. PATENT DOCUMENTS

| 6,597,339 | B1 * | 7/2003 | Ogawa .......................... 345/102 |
| 7,017,053 | B2 | 3/2006 | Mizuyabu et al. |
| 2006/0056712 | A1 * | 3/2006 | Endo ............................. 382/232 |
| 2007/0115302 | A1 * | 5/2007 | Huang .......................... 345/690 |
| 2007/0222789 | A1 * | 9/2007 | Yoshio et al. ................. 345/589 |
| 2008/0211763 | A1 * | 9/2008 | Huang et al. .................. 345/102 |
| 2010/0004031 | A1 * | 1/2010 | Kim .............................. 455/566 |
| 2011/0050416 | A1 * | 3/2011 | Lee ....................... H01M 10/44 340/540 |
| 2011/0109544 | A1 * | 5/2011 | Kitagawa et al. ............. 345/157 |
| 2011/0181628 | A1 | 7/2011 | You et al. |
| 2011/0260958 | A1 * | 10/2011 | Shabel et al. ................. 345/102 |
| 2012/0151236 | A1 * | 6/2012 | Vandeputte et al. .......... 713/324 |

FOREIGN PATENT DOCUMENTS

JP  1995-036438 A  2/1995
KR  10-2010-0135518 A  12/2010

* cited by examiner

Primary Examiner — Pegeman Karimi
(74) Attorney, Agent, or Firm — Cha & Reiter, LLC

(57) ABSTRACT

An apparatus and a method for controlling a screen brightness in a portable terminal, by which consumption of current by the portable terminal can be reduced by reducing the brightness of the display while a screen is being loaded for display. The apparatus preferably includes: a display unit for changing a screen brightness value thereof depending on whether data is operated, and displaying a screen thereof having the changed screen brightness value; and a controller for performing a control operation for changing the screen brightness value while the data is operated, and performing a control operation for causing the changed screen brightness value to return to a screen brightness value before the change when the operation of the data is completed.

20 Claims, 2 Drawing Sheets

APPARATUS AND METHOD FOR
CONTROLLING SCREEN BRIGHTNESS IN
PORTABLE TERMINAL

CLAIM OF PRIORITY

This application claims priority under 35 U.S.C. §119(a) from a Korean Patent Application entitled "Apparatus and Method for Controlling Screen Brightness in Portable Terminal" filed in the Korean Intellectual Property Office on Oct. 14, 2011 and assigned Serial No. 10-2011-0105045, the contents of which are incorporated herein by reference in its entirety.

BACKGROUND OF THE INVENTION

1. Field of the Invention

The present invention relates to an apparatus and a method for controlling a screen brightness in a portable terminal More particularly, the present invention relates to an apparatus and a method for controlling a screen brightness in a portable terminal that provides a reduced current consumption by the portable terminal.

2. Description of the Related Art

Recently manufactured portable terminals now often provide various application functions together with the convergence and complexity of stationary information devices and the discrete devices that used to be necessary to provide such application functions.

For example, communication functions provided by a portable terminal now typically include a function of transmitting/receiving various messages (e.g. transmission/reception of a short message/a multimedia message) together with an existing voice communication function. In addition, the portable terminal can provide a function of acquiring (or capturing) an image using a built-in/external camera module, various game functions, functions that manage a personal schedule, including providing a wake-up call and the like, an MP3 player function, a television reception function, and an Internet function.

A considerable number of functions among the various application functions as described above are functions which are used not for a short period of time but rather over a long period of time. Particularly, the Internet function provided by the portable terminal consumes a large amount of current from the battery because of browsing dominated by a white screen, and thus causes current consumption to increase in the portable terminal Such increased current consumption means the battery wears down faster, adversely affecting user satisfaction.

SUMMARY OF THE INVENTION

Accordingly, an exemplary aspect of the present invention is to provide an apparatus and a method for controlling a screen brightness in a portable terminal, which can advantageously reduce current consumption by the portable terminal.

In accordance with an exemplary aspect of the present invention, an apparatus for controlling a screen brightness in a portable terminal is provided. The apparatus preferably includes: a display unit for changing a screen brightness value thereof depending on whether data is operated, and displaying a screen thereof having the changed screen brightness value; and a controller for performing a control operation for changing the screen brightness value while the data is operated, and performing a control operation for causing the changed screen brightness value to return to a screen brightness value before the change when the operation of the data is completed.

In accordance with another exemplary aspect of the present invention, a statutory method for controlling a screen brightness in a portable terminal is provided. The method preferably includes: determining whether data is operated; and changing the screen brightness value while the data is operated, and causing the changed screen brightness value to return to a screen brightness value before the change when the operation of the data is completed.

In another exemplary embodiment of the present invention, an apparatus for controlling a screen brightness in a portable terminal comprises:

a display unit having a variable screen brightness level that is output in correspondence with a screen brightness control value thereof in which said screen brightness control value depends on whether a data operation is being performed, and the display unit displays a screen having a changed brightness level in accordance with a changed screen brightness control value; and a controller that performs a control operation that changes the screen brightness level displayed by the display unit during a data operation by changing the screen brightness control value output to the display unit, and performs a control operation that additionally changes the screen brightness control value, wherein the screen brightness control value returns the screen brightness level of the display to a screen brightness level that existed prior to the data operation after the data operation is completed.

In another exemplary embodiment of the invention, a method for controlling a screen brightness in a portable terminal, the method comprising:

determining by a controller whether a data operation is occurring; and changing a screen brightness level being output by a display unit by the controller changing a screen brightness control value during a data operation to reduce the screen brightness level being output during the data operation, and the controller further changing the screen brightness control value after the data operation is complete to control the display unit to return to a screen brightness level being output by the display unit prior to determining that a data operation was occurring.

BRIEF DESCRIPTION OF THE DRAWINGS

The above and other exemplary features, aspects, and advantages of the present invention will become more apparent to the person of ordinary skill in the art from the following detailed description taken in conjunction with the accompanying drawings, in which.

DETAILED DESCRIPTION

Figure 1:
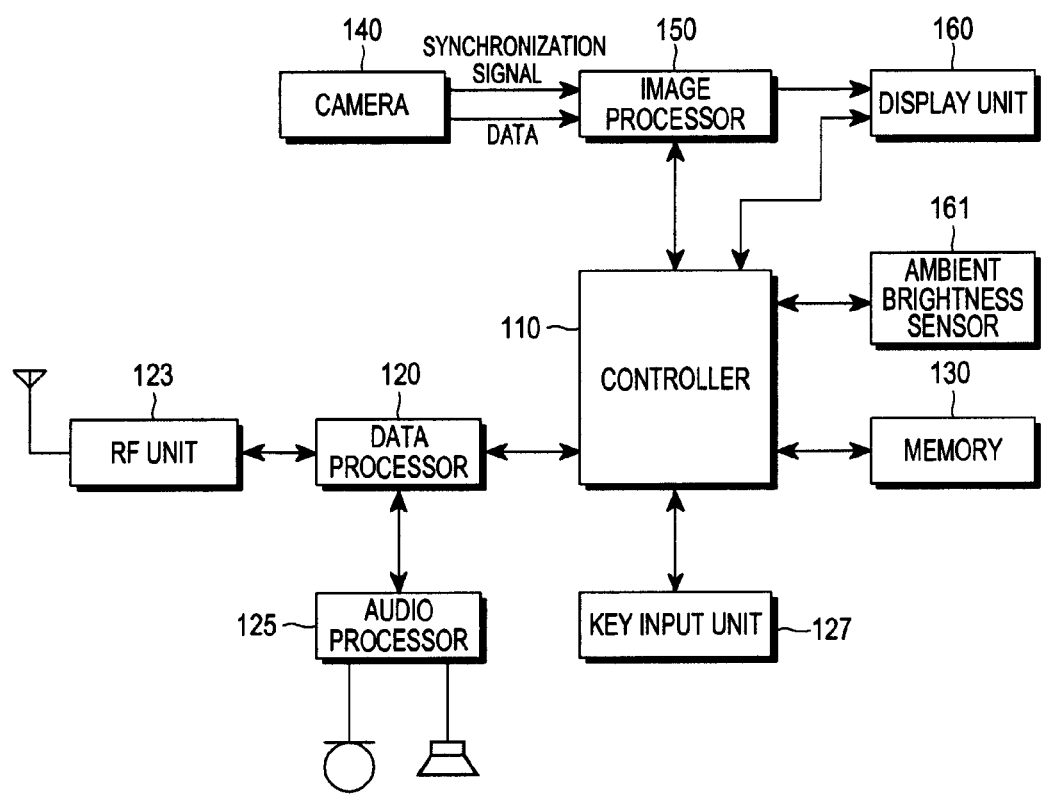
FIG. 1 is a block diagram illustrating the configuration of a portable terminal according to an exemplary embodiment of the present invention.

Hereinafter, exemplary embodiments of the present invention will be described in detail with reference to the accompanying drawings. It should be noted that, in the accompanying drawings, the same elements may be designated by the same reference numerals throughout the following description and drawings although they may be shown in different drawings. Description of well-known structures and functions may be omitted when their inclusion could obscure appreciation of the present invention by a person of ordinary skill in the art.

FIG. 1 is a block diagram illustrating exemplary configuration of a portable terminal according to an exemplary embodiment of the present invention.

Referring now to FIG. 1, a Radio Frequency (RF) unit 123 performs a wireless communication function of the portable terminal. The RF unit 123 includes an RF transmitter for upconverting the frequency of a signal to be transmitted and then amplifying the frequency-upconverted signal, an RF receiver for low-noise amplifying a received signal and then downconverting the frequency of the low-noise amplified signal, etc. A data processor 120 a processor or microprocessor and includes a transmitter that encodes and modulates a signal to be transmitted, a receiver that demodulates and decodes a signal received by the RF unit 123, etc. Namely, the data processor 120 may also include a modem (modulator/demodulator) and a codec (coder/decoder). In this case, the codec includes a data codec for processing packet data and the like, and an audio codec for processing audio signals including voice and the like. An audio processor 125 includes a processor or microprocessor and amplifier circuitry for reproducing a received audio signal, which has been output from the audio codec of the data processor 120, or transmits an audio signal to be transmitted, which is generated from a microphone, to the audio codec of the data processor 120.

With continued reference to FIG. 1, a key input unit 127 may include keys for inputting numbers and text information and function keys for setting various functions.

A memory 130 may include a program memory and a data memory, both of which. are non-transitory mediums, and could be the same machine readable medium. The program memory may store programs for controlling a general operation of the portable terminal and programs for controlling a screen brightness depending on whether data is operated according to an exemplary embodiment of the present invention. Also, the data memory temporarily stores data generated (for one possible example, a cache memory) while the programs are executed.

A controller 110, which includes a processor or microprocessor and associated hardware necessary for operation, controls an overall operation of the portable terminal. The person of ordinary skill in the art should understand and appreciate that all of the processors shown in FIG. 1 could be discretely arranged or combined into one or more units that perform the functions disclosed herein.

According to an exemplary embodiment of the present invention, the controller 110 controls operation of a display unit 160 in order to change a screen brightness value (e.g. a screen brightness control value) of the display unit 160 during a data operation. When the data operation is completed, the controller 110 controls the display unit 160 so as to cause a screen brightness value thereof to return to a screen brightness value displayed prior to the change under direction of controller 110.

Also, according to an exemplary embodiment of the present invention, when a particular application is selected from among a plurality of applications of various types installed on the portable terminal, the controller 110 controls the display unit 160 so as to reduce a present screen brightness value thereof by a predetermined value, and so as to reduce current consumption through the screen brightness control value reduced by the predetermined value until shortly before a start screen of the particular selected application is completed. Next, when the display of the start screen of the particular application is completed, i.e., when the loading of the particular application into the portable terminal has been completed and the display of the start screen capable of starting the particular application is completed, the controller 110 controls the display unit 160 so as to again increase the reduced screen brightness value of the display unit 160 by either the same predetermined value so as to cause the reduced screen brightness value thereof to return to a screen brightness value before the change, or by a different amount for example, after checking remaining battery capacity.

Also, according to an exemplary embodiment of the present invention, when data is selected in the particular application, the controller 110 controls the display unit 160 so as to reduce a present screen brightness value of the display unit 160 by a predetermined value so as to reduce current consumption through the screen brightness value reduced by the predetermined value until shortly before the display of the selected data is completed. The definition of "shortly" can be defined as duration prior to the display of the selected data (such as during loading of the data into the portable terminal or retrieval from storage) that does not impact the display of the selected data. Next, when the display of the selected data is completed, i.e., when the loading of the selected data into the portable terminal has been completed and the selected data is to be displayed on the display unit 160, the controller 110 controls the display unit 160 so as to again increase the reduced screen brightness value of the display unit 160 by a predetermined value, which is typically the same predetermined value or could be a somewhat different value due to, for example, a change in the ambient brightness where the display is located, so as to cause the reduced screen brightness value thereof to return to a screen brightness value before the change.

For example, an ambient brightness sensor 161 senses an external brightness of an environment of the apparatus, and wherein the controller 110 changes the screen brightness control value to return a screen brightness level of the display to a substantial screen brightness level that previously existed and is further modified by a change in the external brightness sensed by the ambient brightness sensor 161 to change the screen brightness level to maximize visibility of the display screen. The controller may perform this action without actually returning the screen to the original brightness and modifying, but instead just providing a brightness control value of the original display that has been modified by changed ambient brightness information as sensed by the ambient sensor.

Also, according to an exemplary embodiment of the present invention, when a zoom-in/out operation of particular data is selected in the particular application, the controller 110 controls the display unit 160 so as to reduce a present screen brightness value of the display unit 160 by a second predetermined value so as to reduce current consumption through the screen brightness value reduced by the second predetermined value until shortly before the zoom-in/out operation of the particular data is completed. Next, when the zoom-in/out operation of the particular data is completed, the controller 110 controls the display unit 160 so as to again increase the reduced screen brightness value of the display unit 160 by a third predetermined value as to cause the reduced screen brightness value thereof to return to a screen brightness value before the initial change. In other words, the first predetermined value is preferably equal in this exemplary embodiment to the second predetermined value plus the third predetermined value.

Also, according to an exemplary embodiment of the present invention, during an operation for loading data, such as, for example, according to a browsing operation in an Internet application, the controller 110 controls the display unit 160 to reduce a present screen brightness value of the display unit 160 by a predetermined value in order to reduce current consumption through the reduced screen brightness value which has been reduced by the predetermined value during the operation for loading the data according to the browsing operation. Next, when the operation for loading the data is completed, the controller 110 controls the display unit 160 to increase the reduced screen brightness value of the display unit 160 (by the predetermined value it was reduced or a different predetermined value), and so as to cause the reduced screen brightness value thereof to return to a screen brightness value before the change. The brightness level could be determined strictly by the brightness of the pixels prior to the change, or take into account the ambient lighting and how it appears to the user if the ambient lighting has changed during the loading operation, for example, by entering a room that has is illuminated.

Also, according to an exemplary embodiment of the present invention, when a zoom-in/out operation of particular data is selected in the Internet application, the controller 110 controls the display unit 160 so as to reduce a present screen brightness value of the display unit 160 by a predetermined value to, and so as to reduce current consumption (typically of a battery) through the screen brightness value being reduced by the predetermined value until shortly before the zoom-in/out operation of the particular data is completed. Next, when the zoom-in/out operation of the particular data is completed, the controller 110 may control the display unit 160 so as to again increase the reduce screen brightness value of the display unit 160 by a predetermined value, and so as to cause the reduce screen brightness value thereof to return to a screen brightness value before the change.

In an exemplary embodiment of the present invention, the above predetermined value may be basically set as a default or may be set or reset by a user.

Also, according to another exemplary embodiment of the present invention, the controller 110 may perform a control operation for sequentially changing a screen brightness value depending on a time period during which data is operated (i.e. a time period until shortly before the operation of data is completed). For example, based on a typical or estimated time to load the screen data for display, the brightness can increase in sequence until equal to its previous level prior to being reduced as a result of the browser action or other action that would delay a display by the portable terminal.

Also, according to an exemplary embodiment of the present invention, the controller 110 may perform a control operation for changing a screen brightness of the display unit 160 in such a manner as to apply different screen brightness values to a screen brightness thereof according to the types of applications to be displayed. Thus, for example, if a certain application has a reduced level of brightness than a current application being displayed, a first predetermined value brightness A camera 140 preferably includes a camera sensor for capturing image data and converting the captured light signal to an electrical signal, and a signal processor for converting the analog image signal, which has been captured by the camera sensor, to digital data. In this case, it is assumed that the camera sensor is a CCD (Charge-Coupled Device) sensor or a CMOS (Complementary Metal-Oxide Semiconductor) sensor, and the signal processor may be implemented by using a DSP (Digital Signal Processor). Also, the camera sensor and the signal processor may be implemented as one unit, or may be implemented as separate elements.

An image processor 150 performs Image Signal Processing (ISP) for displaying an image signal, which has been output from the camera 140, by a display unit 160. In this particular example, the term "ISP" refers to the execution of functions including a gamma correction, an interpolation, a spatial change, an image effect, an image scale, AWB (Auto White Balance), AE (Auto Exposure), AF (Auto Focus), etc. Therefore, the image processor 150 processes the image signal, which has been output from the camera 140, on a frame-by-frame basis, and outputs the frame image data in such a manner as to meet the characteristics and the size of the display unit 160. Also, the image processor 150 includes an image codec, and compresses the frame image data displayed by the display unit 160 in a set scheme, or restores the compressed frame image data to an original frame image data. In this particular example, the image codec may be implemented by using either a JPEG (Joint Photographic Coding Experts Group) codec, an MPEG-4 (Moving Picture Experts Group-4) codec, a Wavelet codec, or the like. It is assumed that the image processor 150 preferably includes an On-Screen Display (OSD) function. The image processor 150 may output on-screen display data according to the size of a screen displayed under the control of the controller 110.

With continued reference to FIG. 1, the display unit 160 displays an image signal, which has been output from the image processor 150, on a screen thereof, and displays user data which has been output from the controller 110. In this case, the display unit 160 may employ an LCD (Liquid Crystal Display), and thus may include an LCD controller, a memory capable of storing image data, an LCD display element, etc. When the LCD employs a touch screen, the display unit 160 may operate as an input unit, or as a main or auxiliary input unit. It should be understood and appreciated that the presently claimed invention is not limited to a particular type of display screen, and for example, LED, OLED AMOLED are just a few non-limiting examples of display screens that can be used with the presently claimed invention. An artisan should appreciate that any type of thin-film-technology screen may comprise the display for both an apparatus or method of the present invention. At this time, the display unit 160 may display keys which are identical to those of the key input unit 127.

Also, according to an exemplary embodiment of the present invention, the display unit 160 changes a value of screen brightness value displayed depending on whether the portable terminal is undergoing a data operation, and displays a screen thereof having the changed screen brightness value. During a data operation, the display unit 160 reduces a screen brightness value thereof by a predetermined value, and displays the screen having the screen brightness value reduced by the predetermined value. When the operation of the data is completed, the display unit 160 again increases the reduced screen brightness value thereof by a predetermined value so as to cause the reduced screen brightness value thereof to return preferably to a screen brightness value before the change, and displays the screen having the screen brightness value returned to the screen brightness value before the change.

An exemplary operation for controlling a screen brightness by the portable terminal as described above will be described below in detail with reference to FIG. 2.

Figure 2:
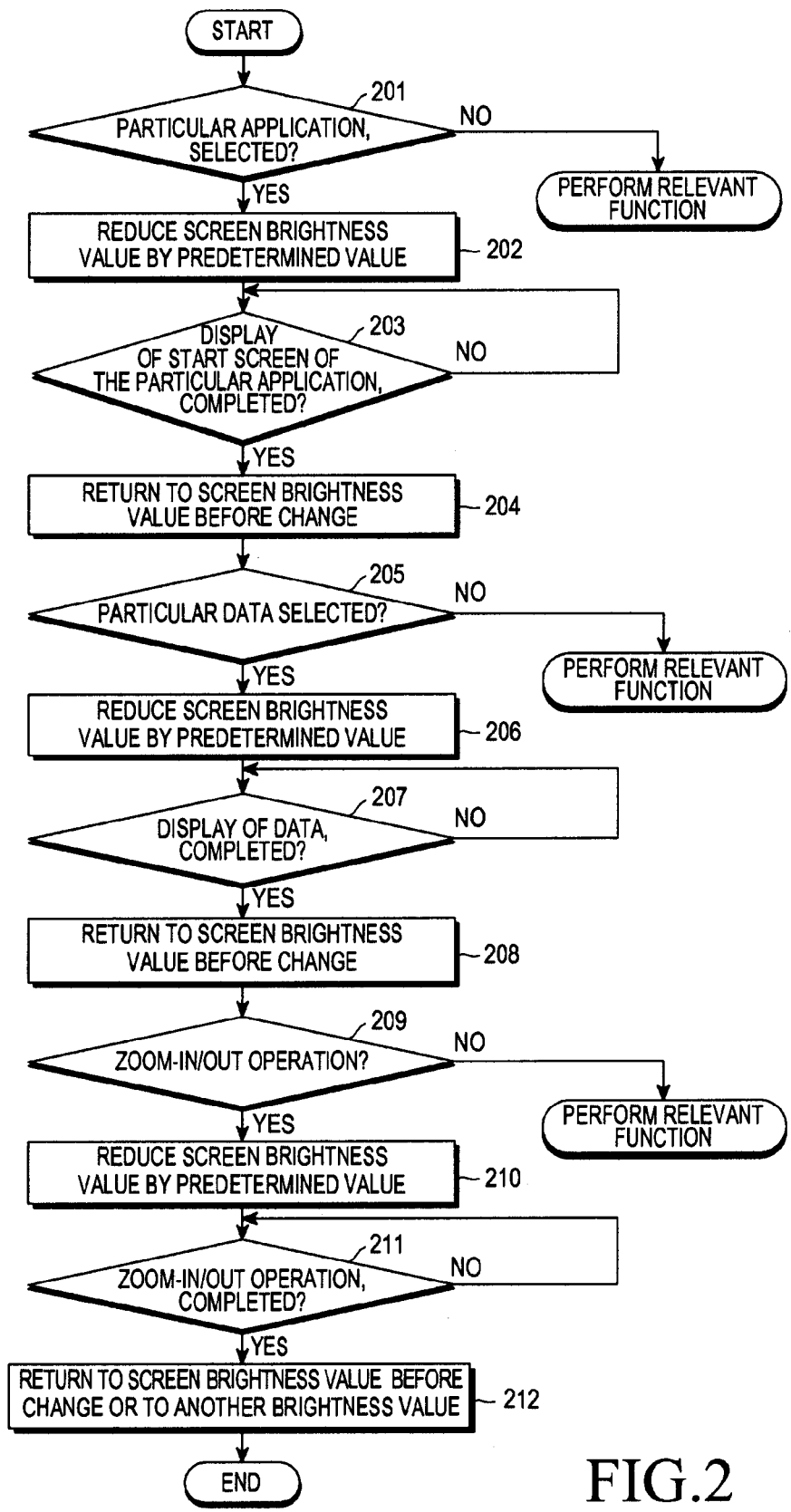
FIG. 2 is a flowchart illustrating exemplary operation of a method for controlling a screen brightness in a portable terminal according to an exemplary embodiment of the present invention.

FIG. 2 is a flowchart illustrating a method for controlling a screen brightness in a portable terminal according to an exemplary embodiment of the present invention.

Hereinafter, an exemplary embodiment of the present invention will be described in detail with reference to FIG. 2, together with FIG. 1.

With reference now to FIG. 2, when a particular application has been selected from among multiple applications installed on the portable terminal, the controller 110 senses the selection of the particular application in step 201, and proceeds to step 202 where a present screen brightness value of the display unit 160 is reduced by a predetermined value.

While a screen brightness value of the display unit 160 has been reduced by a predetermined value and the screen thereof having the screen brightness value reduced by the predetermined value is displayed, when the loading of the particular selected application into the portable terminal has completed and the display of a start screen capable of starting the execution of the particular application is completed, the controller 110 senses, in step 203, the completion of the display of the start screen capable of starting the execution of the particular application, and proceeds to step 204.

In step 204, the controller 110 controls the display unit 160 so as to again increase the reduced screen brightness value of the display unit 160 by a predetermined value, which is preferably the same predetermined brightness value by which the display was reduced at step 202, by it can be a smaller or larger brightness value, so as to cause the reduced screen brightness value thereof to return to a screen brightness value before the change.

In step 205, when particular data is selected in the particular application, the controller 110 senses the selection of the particular data in step 205, and proceeds to step 206 where a present screen brightness value of the display unit 160 is reduced by a predetermined value. In this case, a predetermined value in step 206 may be set in such a manner as to be equal to or different from the predetermined value in step 202.

While the screen brightness value of the display unit 160 has been reduced by the predetermined value and the screen thereof having the screen brightness value reduced by the predetermined value is displayed, when the loading of the selected data into the portable terminal has been completed and the selected data is displayed on the display unit 160, the controller 110 senses the completion of the display of the selected data in step 207, and proceeds to perform step 208.

In step 208, the controller 110 controls the display unit 160 so as to again increase the reduced screen brightness value of the display unit 160 by a predetermined value, and so as to cause the reduced screen brightness value thereof to return to a screen brightness value before the change.

Also, when a zoom-in/out operation of the data is selected, the controller 110 senses the selection of the zoom-in/out of the data in step 209, and proceeds to perform step 210 wherein a present screen brightness value of the display unit 160 is reduced by a predetermined value. In this particular case, a predetermined value in step 210 may be set in such a manner as to be equal to or different from a predetermined value in step 202 or step 206. The values may be different according to respective applications, zoom operations, changes in ambient brightness (detected by a brightness sensor), etc.

While the screen brightness value of the display unit 160 has been reduced by the predetermined value and the screen thereof having the screen brightness value reduced by the predetermined value is displayed, then at step 211 it is determined by the controller whether the zoom-in/out operation of the selected data has been completed and the completion of the zoom-in/out operation of the selected data is displayed in the screen thereof, the controller 110 senses the completion of the zoom-in/out operation of the selected data, and then step 212 is performed.

In step 212, the controller 110 controls the display unit 160 so as to again increase the reduced screen brightness value of the display unit 160 by a predetermined value, and to control the reduced screen brightness value thereof to return to a screen brightness value before the change.

For example, when an Internet application has been selected on the portable terminal, until shortly before the display of a start screen capable of performing the Internet application is completed, the controller 110 controls the display unit 160 so as to reduce a present screen brightness value of the display unit 160 by a predetermined value (e.g. 50 cd is a non-limiting example). When the display of the start screen of the Internet application is completed, the controller 110 controls the display unit 160 so as to increase the reduced screen brightness value thereof by a predetermined value (e.g. 50 cd), and so as to cause the reduced screen brightness value thereof to return to a screen brightness value before the change.

Then, while the process moves to a desired website through browsing in the Internet application and data is loaded into the portable terminal, the controller 110 controls the display unit 160 so as to reduce a present screen brightness value of the display unit 160 by a predetermined value (e.g. 50 cd). When the loading of the data is completed, the controller 110 controls the display unit 160 so as to increase the reduced screen brightness value thereof by a predetermined value (e.g. 50 cd), and so as to cause the reduced screen brightness value thereof to return to a screen brightness value before the change.

Otherwise, when a zoom-in/out operation of particular data is performed on a screen which is presently being displayed by Internet application, the controller 110 controls the display unit 160 so as to reduce a present screen brightness value of the display unit 160 by a predetermined value (e.g. 50 cd). When the zoom-in/out operation of the particular data is completed, the controller 110 controls the display unit 160 to increase the reduced screen brightness value thereof by a predetermined value (e.g. 50 cd), to control the reduced screen brightness value thereof to return to a screen brightness value before the change.

In another example, when an album application has been selected on the portable terminal, until shortly before the display of a start screen capable of performing the selected album application is completed, the controller 110 controls the display unit 160 so as to reduce a present screen brightness value of the display unit 160 by a predetermined value. When the display of the start screen of the an album application is completed, the controller 110 controls the display unit 160 to increase the reduced screen brightness value thereof by a predetermined value, to cause the reduced screen brightness value thereof to return to a screen brightness value before the change.

When particular data has been selected in the album application, while the particular data is loaded into the portable terminal, the controller 110 controls the display unit 160 to reduce a present screen brightness value of the display unit 160 by a predetermined value. When the loading of the particular data into the portable terminal has been completed and the particular data is displayed on the screen of the display unit 160, the controller 110 controls the display unit 160 to increase the reduced screen brightness value thereof by a predetermined value, and to cause the reduced screen brightness value thereof to return to a screen brightness value before the change.

Otherwise, when a zoom-in/out operation of particular data has been selected in the album application, while the zoom-in/out operation of the particular data is performed, the controller 110 controls the display unit 160 so as to reduce a present screen brightness value of the display unit 160 by a predetermined value. When the zoom-in/out operation of the particular data is completed, the controller 110 controls the display unit 160 so as to again increase the reduced screen brightness value thereof by a predetermined value, and so as to cause the reduced screen brightness value thereof to return to a screen brightness value before the change The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Under no circumstances is a broadest reasonable interpretation of the appended claims to include a non-statutory interpretation such as a series of mental acts or manual steps, as such a non-statutory interpretation is inconsistent with the invention disclosed by the present specification.

As described above, the apparatus and the method, by which in a portable terminal, a screen brightness can be automatically controlled depending on whether data is operated, selected, zoomed in on, or otherwise retrieved or loaded has been disclosed herein. Therefore, it is possible to save consumption current of the portable terminal.

Although the specific exemplary embodiments such as a portable terminal have been shown and described in the description of the present invention as described above, various changes in form and details may be made in the specific exemplary embodiments of the present invention without departing from the spirit and scope of the present invention. Therefore, the spirit and scope of the present invention is not limited to the described embodiments thereof, but is defined by the appended claims and equivalents.

What is claimed is:

1. A method for controlling a brightness in a portable terminal, the method comprising:
    displaying at least one item on a display unit of the portable terminal;
    receiving input for selecting one item among the at least one item;
    initiating a loading operation for executing the selected item;
    automatically changing a brightness of the display unit to a predetermined brightness value in response to initiating the loading operation and prior to a display of data of the selected item and changing the brightness of the display unit after the loading operation has completed to provide a brightness value that has been modified by changed ambient brightness as sensed by an ambient sensor and based on a type of the selected item, and
    displaying the at least one item on the display unit of the portable terminal with the predetermined brightness value during the loading operation, wherein
    the predetermined brightness value is greater than zero.

2. The method as claimed in claim 1, wherein the changing of the brightness of the display unit comprises changing the brightness of the display unit by applying a set brightness to the selected item.

3. The method as claimed in claim 1, further comprising, changing the brightness after the loading operation has been completed.

4. The method as claimed in claim 1, wherein the automatically changing of the brightness of the display unit comprises decreasing the brightness of the display unit during the loading operation.

5. The method as claimed in claim 1, wherein the item includes an application.

6. The method as claimed in claim 5, wherein the application comprises at least one of:
    an album application;
    an Internet application; and
    a Television (TV) application.

7. The method as claimed in claim 1, wherein the item includes particular data executable by the portable terminal.

8. The method as claimed in claim 7, wherein the data includes image data.

9. The method as claimed in claim 7, further comprising bringing the brightness of the display unit back to a brightness value before being changed, when execution of the data has been completed.

10. The method as claimed in claim 7, further comprising sequentially changing the brightness of the display unit until execution of the data is completed.

11. A portable terminal comprising:
    a display unit that displays a screen image on a screen thereof; and
    a controller configured to display at least one item on the display unit, receive input for selecting the at least one item, initiate a loading operation for executing the selected item and display the at least one item on the display unit of the portable terminal with a predetermined brightness value during the loading operation prior to a display of data of the selected item, changing the brightness of the display unit after the loading operation has completed to provide a brightness value that has been modified by changed ambient brightness as sensed by an ambient sensor and based on a type of the selected item, wherein
    the predetermined brightness value is greater than zero.

12. The portable terminal as claimed in claim 11, wherein the controller changes the brightness of the display unit by applying a set brightness to the selected item.

13. The portable terminal as claimed in claim 11, wherein after the loading operation has ended, the controller changes the brightness of the display unit.

14. The portable terminal as claimed in claim 11, wherein the controller changes the brightness of the display unit to increase during the loading operation.

15. The portable terminal as claimed in claim 11, wherein the item includes an application.

16. The portable terminal as claimed in claim 15, wherein the application comprises at least one of:
    an album application;
    an Internet application; and
    a Television (TV) application.

17. The portable terminal as claimed in claim 11, wherein the item includes particular data executable by the portable terminal.

18. The portable terminal as claimed in claim 17, wherein the data includes image data.

19. The portable terminal as claimed in claim 17, wherein the controller changes the brightness of the display unit to decrease during the loading operation.

20. The portable terminal as claimed in claim 17, wherein the controller sequentially changes the brightness of the display unit until execution of the data is completed.

* * * * *